(12) United States Patent
Chidambaram Nachiappan et al.

(10) Patent No.: US 11,809,906 B2
(45) Date of Patent: Nov. 7, 2023

(54) SYSTEMS AND METHODS TO CONTROL BANDWIDTH THROUGH SHARED TRANSACTION LIMITS

(71) Applicant: Apple Inc., Cupertino, CA (US)

(72) Inventors: Nachiappan Chidambaram Nachiappan, Santa Clara, CA (US); Matthew R. Johnson, Newark, CA (US); Vinodh R. Cuppu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/902,452

(22) Filed: Sep. 2, 2022

(65) Prior Publication Data
US 2022/0413908 A1  Dec. 29, 2022

Related U.S. Application Data

(63) Continuation of application No. 16/852,107, filed on Apr. 17, 2020, now Pat. No. 11,436,049.

(51) Int. Cl.
| | |
|---|---|
| *G06F 9/48* | (2006.01) |
| *G06F 13/16* | (2006.01) |
| *H04L 41/0896* | (2022.01) |
| *G06F 9/50* | (2006.01) |
| *H04L 41/046* | (2022.01) |

(52) U.S. Cl.
CPC .......... *G06F 9/4881* (2013.01); *G06F 13/161* (2013.01); *G06F 13/1668* (2013.01); *H04L 41/0896* (2013.01)

(58) Field of Classification Search
CPC .............................. G06F 15/173; G06Q 20/22
See application file for complete search history.

(56) References Cited

U.S. PATENT DOCUMENTS

| | | | |
|---|---|---|---|
| 9,923,818 B2 | 3/2018 | Cj et al. | |
| 10,305,802 B2 | 5/2019 | Birrittella et al. | |
| 11,436,049 B2 | 9/2022 | Chidambaram Nachiappan et al. | |
| 2004/0156369 A1 | 8/2004 | Nakagawa et al. | |
| 2008/0123525 A1 | 5/2008 | Miyoshi et al. | |
| 2009/0070457 A1* | 3/2009 | McKinney | G06F 11/3495 709/224 |
| 2014/0172704 A1* | 6/2014 | Atagun | G06Q 20/322 705/44 |

(Continued)

*Primary Examiner* — Getente A Yimer
(74) *Attorney, Agent, or Firm* — Robert C. Kowert; Kowert, Hood, Munyon, Ranking & Goetzel, P.C.

(57) ABSTRACT

Systems, apparatuses, and methods for controlling bandwidth through shared transaction limits are described. An apparatus includes at least a plurality of agents, a plurality of transaction-limit (T-Limit) nodes, a T-Limit manager, and one or more endpoints. The T-Limit manager creates a plurality of credits for the plurality of agents to send transactions to a given endpoint. Then, the T-Limit manager partitions the credits into N+1 portions for N agents, wherein the extra N+1 portion is a shared pool for use by agents when they run out of their private credits. The T-Limit manager assigns a separate private portion of the N portions to the N agents for use by only the corresponding agent. When an agent runs out of private credits, the agent's T-Limit node sends a request to the T-Limit manager for credits from the shared pool.

20 Claims, 8 Drawing Sheets

(56) References Cited

U.S. PATENT DOCUMENTS

| | | |
|---|---|---|
| 2016/0358250 A1 | 12/2016 | Dogin et al. |
| 2017/0155590 A1 | 6/2017 | Dillon et al. |
| 2017/0345094 A1* | 11/2017 | Manukyan ............ H04L 65/102 |
| 2022/0270077 A1* | 8/2022 | Wyatt .................... G06Q 20/24 |

\* cited by examiner

| Policy 302 | Rank | Agent |
|---|---|---|
| | 1 | Agents 310 and 312 |
| | 2 | Agents 314, 316, and 318 |
| | 3 | All Other Agents |

| Policy 304 | Bandwidth Share | Agent |
|---|---|---|
| | 3X | Agents 320 and 322 |
| | 2X | Agents 324, 326, and 328 |
| | X | All Other Agents |

SYSTEMS AND METHODS TO CONTROL BANDWIDTH THROUGH SHARED TRANSACTION LIMITS

CROSS REFERENCE TO RELATED APPLICATIONS

This application is a continuation of U.S. patent application Ser. No. 16/852,107, now U.S. Pat. No. 11,436,049, entitled "Systems and Methods to Control Bandwidth Through Shared Transaction Limits", filed Apr. 17, 2020, the entirety of which is incorporated herein by reference.

BACKGROUND

Technical Field

Embodiments described herein relate to the field of computing systems and, more particularly, to controlling memory bandwidth using shared transaction limits.

Description of the Related Art

Digital systems of diverse types generally include a variety of components connected together via a communication fabric. These components may be broadly referred to as agents and endpoints. Examples of agents include, but are not limited to, multimedia engines, digital signal processors (DSPs), central processing units (CPUs), data parallel processors, graphics processing units (GPUs), and others. Examples of endpoints include, but are not limited to, input/output (I/O) devices, peripheral devices, memory controllers, memory devices, memory subsystems, communication interfaces, speakers, displays and so on. In such systems, data may be shared among the different agents of the system and among the available endpoints.

As new complex use cases grow, the minimum bandwidth needed by an agent to satisfy quality of service (QoS) requirements grows. As chip designs increase in sophistication, bandwidth requirements continue to increase, and hence each endpoint (e.g., memory subsystem) needs to support more outstanding requests. On the other hand, for other, simpler use cases, the agents in the system do not need to have as many requests outstanding, but still end up sending as many requests as possible because they typically do not have information regarding the number of requests they should send. Moreover, the appropriate number of requests to send is not only dependent on their own required bandwidth and observed latency, but may also vary based on other agents that are active in the system. Without agents having a control over the number of requests they have outstanding, the bandwidth share achieved by each agent would be proportional to the number of requests that are sent to the endpoint. This is inefficient at multiple levels. For example, in a simple case where there are two agents which exhibit different energy-efficiencies, it would be beneficial from an energy standpoint to get the lower-efficiency agent to finish its task sooner and power down. In such cases, enabling more outstanding requests for the lower-efficiency agent relative to the higher-efficiency agent would help the former finish faster.

SUMMARY

Systems, apparatuses, and methods for controlling bandwidth through shared transaction limits are contemplated. In one embodiment, an apparatus includes a plurality of agents, a plurality of transaction-limit (T-Limit) nodes, a T-Limit manager, and one or more endpoints. The apparatus determines the minimum number of outstanding transactions required to keep a given endpoint at its maximum efficiency. In one embodiment, the minimum number of outstanding transactions required to keep a given endpoint at its maximum utilization is just based on the rate of processing at the given endpoint. As an example, for a memory system, the minimum number of outstanding transactions required to keep the memory system at its maximum efficiency is determined by the frequency of the memory and the numbers of channels and banks able to be concurrently accessed. For simplicity, it is also assumed that whenever memory is utilized, it operates efficiently as well by re-ordering requests in an efficient manner which can increase bandwidth. With more parallel capability in the memory system, through more channels and banks, or higher operating frequency, more transactions need to be outstanding at any given time to maximize utilization.

However, there is a point at which the memory system is operating at its maximum efficiency and adding more transactions would not increase the utilized bandwidth, because every cycle has been consumed by a pending transaction. Adding more transactions at this point only increases the average round trip latency observed by the agents. From the agents' perspective, when they observe an increase in latency, they react by sending more requests to the memory to hide and offset the increased latency. Eventually, this apparatus ends up in a scenario where agents simply add more and more requests, thereby increasing the queuing latency without getting proportional bandwidth or efficiency benefits. This also leads to agents competing against each other by generating more transactions, stealing memory slots (at the bank and channel queues) from other agents, and thereby taking a larger share of the memory bandwidth ("bandwidth-share"). Eventually, this becomes detrimental for the other agents who did not increase their respective number of maximum outstanding transactions, and often is not the most optimal setup for the whole system.

In one embodiment, the T-Limit manager creates a plurality of credits for the plurality of agents to send transactions to a given endpoint. The given endpoint may be a memory subsystem or other type of device. Then, the T-Limit manager partitions the credits into N+1 portions for N agents, wherein N is a positive integer, and wherein the extra $N+1^{th}$ portion is a shared pool for use by agents when they run out of their private credits. The T-Limit manager assigns a separate private portion of the N portions to the N agents for use by only the corresponding agent. Each T-Limit node manages the credits on behalf of a corresponding agent. When an agent requires more bandwidth than what its private credits are provisioned for, the agent will eventually run out of private credits. At that point, the agent's T-Limit node sends a request to the T-Limit manager asking for credits from the shared pool. This way, the T-Limit manager receives requests from multiple agents. The T-Limit manager decides which agents should receive credits from the shared pool when the apparatus is experiencing heavy traffic and when many agents are trying to pump a large number of requests at the same time. The total number of outstanding transactions that are allowed to be in the apparatus at any given time are limited to the sum of the N+1 portions. The number of credits in the N+1 portions corresponds to the number of concurrent transactions that will cause the given endpoint to be operating at its maximum efficiency. In one embodiment, the total number of credits in the N+1 portions would vary based on a variety of parameters, while in another embodiment, the total number of credits in the N+1 portions could simply be a static number.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
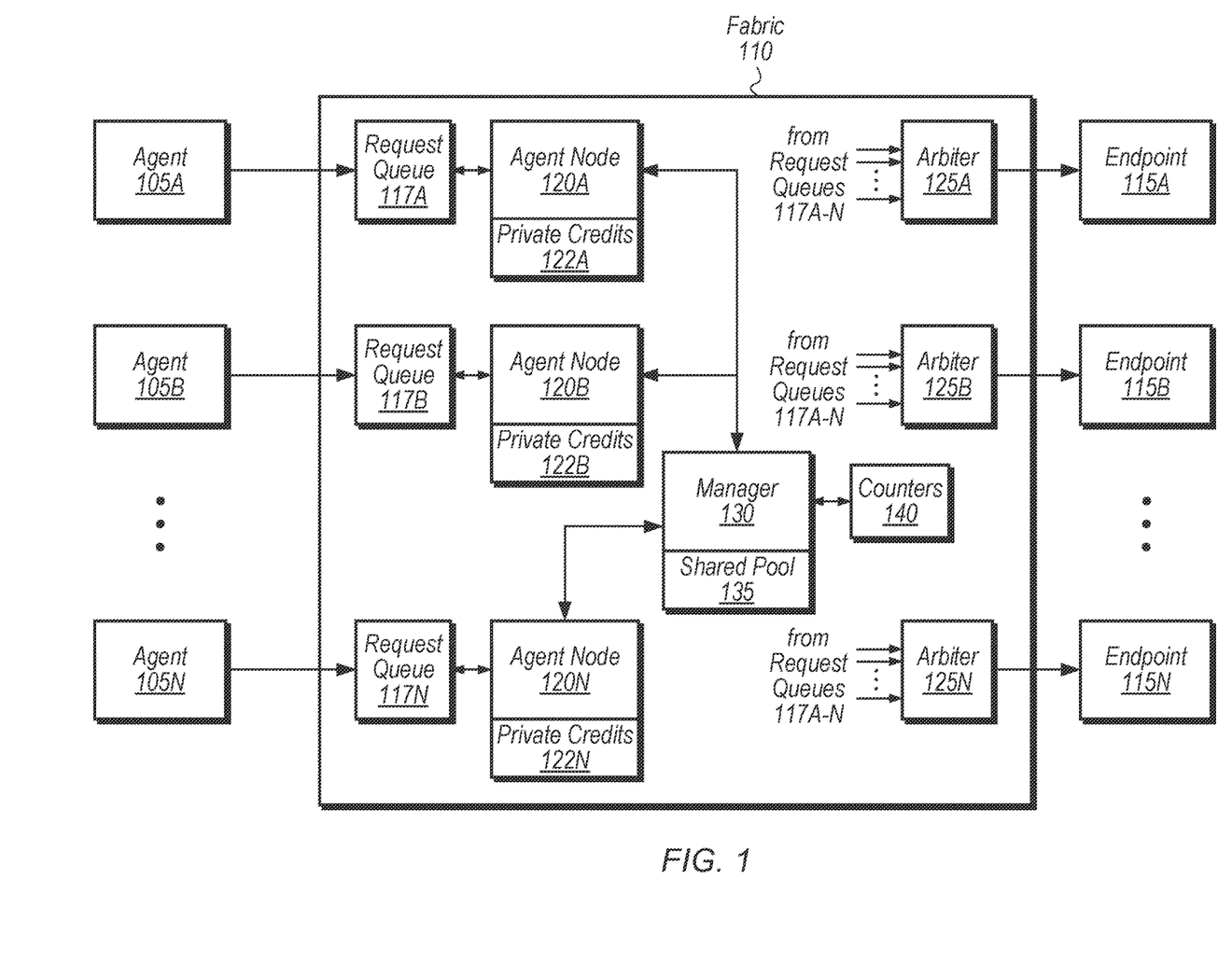
FIG. 1 is a generalized block diagram of one embodiment of an apparatus.

Referring to FIG. 1, a block diagram of one embodiment of an apparatus 100 is shown. In one embodiment, apparatus 100 includes agents 105A-N, fabric 110, and endpoints 115A-N. Agents 105A-N are representative of any number and type of agents. Examples of agents include, but are not limited to, processing units, display controllers, graphics processing units (GPUs), and the like. Endpoints 115A-N are representative of any number and type of endpoints. Examples of endpoints include, but are not limited to, memory controllers, memory subsystems, memory devices, memory interfaces, input/output (I/O) interfaces, I/O devices, peripheral devices, and so on. It is noted that apparatus 100 may also include or be connected to any number of other components (e.g., power supply, clock source) which are not shown to avoid obscuring the figure.

Fabric 110 is representative of any type and combination of fabric, interconnect, bus connections, crossbars, and the like for providing connections between agents 105A-N and endpoints 115A-N. In one embodiment, fabric 110 includes an arbiter 125A-N for each endpoint 115A-N. Each arbiter 125A-N is responsible for arbitrating between transactions received from the request queues 117A-N corresponding to the various agents 105A-N. It is noted that fabric 110 may include connections between each of the request queues 117A-N and each of the arbiters 125A-N, although these connections are not shown to avoid obscuring the figure.

In one embodiment, fabric 110 includes agent nodes 120A-N which manage the credits allocated to their corresponding agents 105A-N. In one embodiment, there is a one-to-one correspondence between agents 105A-N and agent nodes 120A-N. In other words, each agent 105A-N has a corresponding agent node 120A-N. In one embodiment, manager 130 maintains counters 140 to track the total number of transactions in-flight in fabric 110 and in the memory subsystem to the difference endpoints 115A-N. Manager 130 also manages shared pool 135 which includes shared credits which are available to any of the agent nodes 120A-N. It is noted that manager 130 may also be referred to as transaction limit (T-Limit) manager 130. It is also noted that "transactions" may also be referred to as "packets", "requests", "messages", or other similar terms. Agent nodes 120A-N and manager 130 may be implemented using any suitable combination of hardware (e.g., control logic, processing unit) and/or software (e.g., program instructions).

In one embodiment, manager 130 assigns a number of private credits 122A-N to each of the agent nodes 120A-N. Private credits 122A-N are used by the corresponding agents 105A-N to send transactions to a given endpoint 115. In one embodiment, each agent node 120A-N has a separate set of private credits 122A-N for each different endpoint 115A-N. For example, in this embodiment, agent node 120A has a first set of private credits 122A for sending transactions to endpoint 115A, agent node 120A has a second set of private credits 122A for sending transactions to endpoint 115B, and so on. When a given agent 105 wants to send a transaction to a given endpoint 115, the corresponding agent node 120 will check to see if there is an available credit in the private credits 122. If there is an available credit, then the agent node 120 will enable the transaction to be sent to the corresponding arbiter 125 coupled to the given endpoint 115 and deduct a credit from the private credits 122. If there are no available credits in the agent's private credits 122, then the agent node 120 will send a request to manager 130 for one of the credits in shared pool 135.

If a credit is available in shared pool 135, then manager 130 will send a credit to the agent node 120 and deduct the credit from shared pool 135. When agent node 120 receives the credit, the agent node 120 will notify the agent 105 and then the transaction is sent to the given endpoint 115A-N via the corresponding arbiter 125A-N. In another embodiment, the credit can be directly sent to the agent 105 and the agent will then send the transaction to the given endpoint 115A-N. If no credits are available in shared pool 135, then the agent 105 will wait until credits become available in their own private credits 122 or the agent 105 will wait until credits become available again in shared pool 135.

Typically, apparatus 100 consists of multiple agents 105A-N with different access behaviors and different latency tolerances. Some agents can have hundreds of requests in flight concurrently, and issue more without ever being stalled for the responses (e.g., GPUs). There are other agents which are latency sensitive and hence need quick responses to guarantee high performance (e.g., video encoders, video decoders). Moreover, some agents can easily demand large bandwidth shares, and hence cannot be classified under a low-latency (LLT) class. In other words, every agent has a different latency sensitivity and different performance requirement even though some may be classified under a particular traffic class.

Typically, from a memory perspective, the number of requests outstanding in the memory system determines the amount of bandwidth achieved. For example, if there can only be one request outstanding at a time, the set of agents 105A-N needing data have to wait for the response before issuing another request, regardless of how requests are arbitrated. While the request is in flight to the memory and when the response is in flight to the agent, the memory system idles and efficiency is lost during those periods. With more requests outstanding, these periods can be utilized to get more data out of memory which can improve bandwidth utilization. With more parallel capability in the memory system, through more channels and banks, or higher operating frequency of the memory, more outstanding requests are needed at any given moment for the memory system to be efficient. But there is a point when the memory is operating at maximum efficiency and adding more requests would not give any more bandwidth, because every cycle has been utilized by a pending request. Increasing the number of requests when the memory is operating at maximum efficiency only increases the queueing latency of the requests, thereby increasing round-trip latency observed by the agent.

From the agent's perspective, when the memory system is overloaded with more requests that what is needed for maximum efficiency, apparatus 100 ends up in a scenario where agents simply add more queuing latency without gaining any bandwidth or efficiency benefits. This also leads to agents competing against each other by generating more requests, hoping for taking up more memory slots (at the bank and channel queues) and thereby a larger share of the memory bandwidth. Eventually, this becomes detrimental for the other agents who did not increase their maximum outstanding. This is typically realized when running applications that are stressful or barely meeting their performance requirement. A potential solution for this is to increase the number of outstanding requests of all the victimized agents. Inevitably, this victimizes another agent and the cycle continues. Accordingly, a more intelligent scheme for managing the traffic generated by agents 105A-N is desired.

Figure 2:
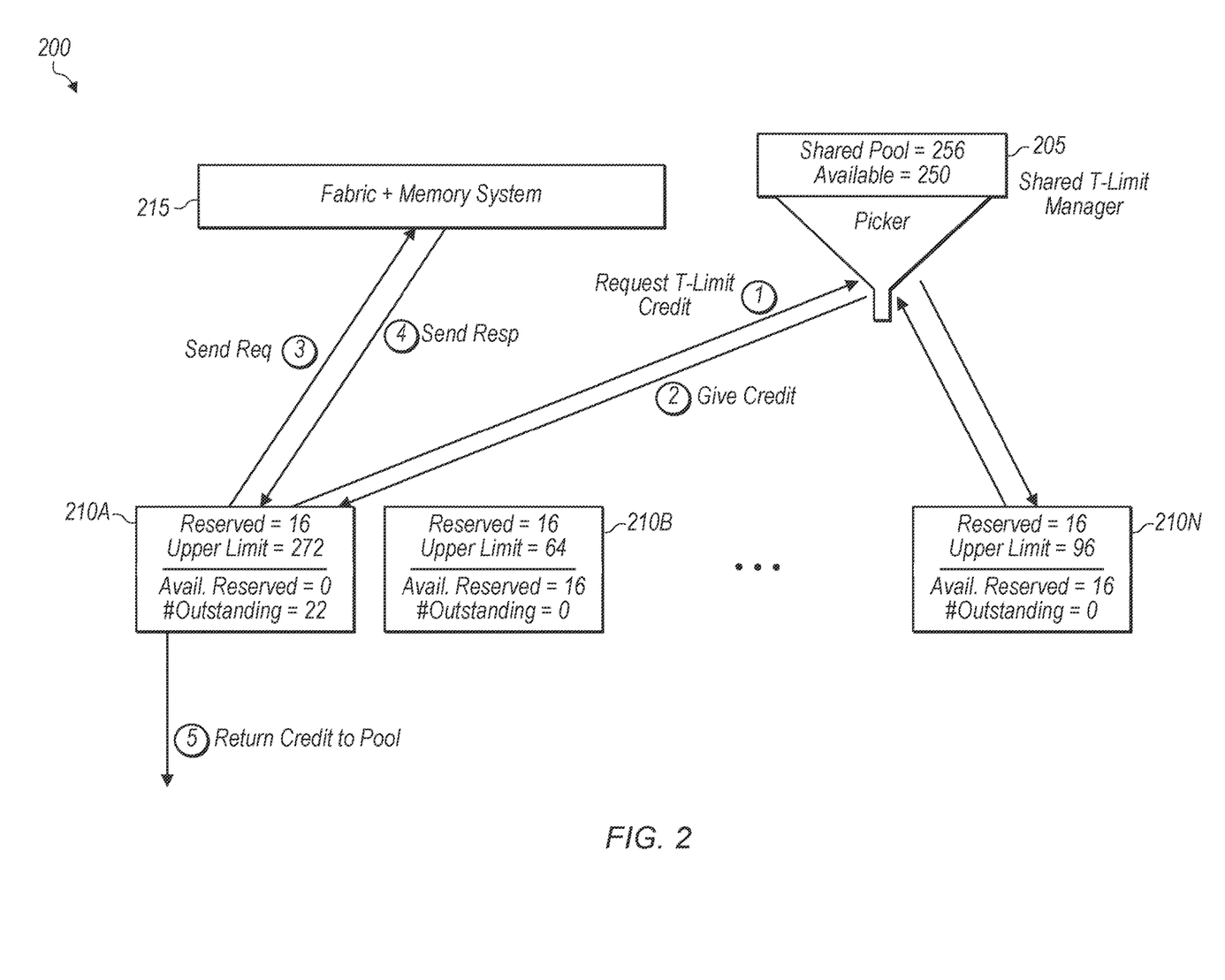
FIG. 2 is a generalized block diagram illustrating one embodiment of a transaction-limit (T-Limit) manager and T-Limit nodes.

Turning now to FIG. 2, a block diagram of one embodiment of a transaction-limit (T-Limit) manager 205 and T-Limit nodes 210A-N is shown. In one embodiment, a system includes a T-Limit manager 205 and a plurality of T-Limit nodes 210A-N to intelligently manage the number of outstanding requests in fabric and memory system 215. To avoid obscuring the figure, the agents corresponding to T-Limit nodes 210A-N are not shown. In one embodiment, T-Limit manager 205 allocates a set of reserved credits and upper limits to each T-Limit node 210A-N. T-Limit manager 205 also maintains a shared pool of credits which are available by request when a given T-Limit node exhausts its supply of reserved credits. T-Limit manager 205 includes a picker to select which node receives a credit when multiple nodes are requesting more credits than are currently available. T-Limit manager 205 uses any of various schemes for determining how to grant shared credits to the various T-Limit nodes 210A-N.

For example, in one embodiment, T-Limit manager 205 ranks the various T-Limit nodes 210A-N by priority, and the node with the highest priority receives credits when multiple nodes are requesting more shared credits than are currently available. In one embodiment, the priority of a T-Limit node 210A-N is determined based on how dependent the corresponding agent is to latency. In another embodiment, the priority of a T-Limit node 210A-N is determined based on how much more performance the corresponding agent needs compared to another agent of the same virtual channel (VC). In another embodiment, T-Limit manager 205 uses a machine-learning model to determine which T-Limit nodes 210A-N receive shared credits when there are not enough shared credits for the requesting nodes. For example, in this embodiment, the inputs to the machine-learning model may include the priorities of the nodes, the performance requirements of the nodes, the number of outstanding transactions, the current number of shared credits in the shared pool, which agents are active, the status of the active agents, and/or other parameters. In response to the inputs, the machine-learning model generates a vector with a number of credits to grant to each node in the given arbitration cycle. In other embodiments, the machine-learning model may operate in other suitable manners to determine which agent (s) receive credits when there are multiple requests for credits.

In one embodiment, T-Limit node 210A has a total of 16 reserved (i.e., private) credits and an upper limit of 272 credits that are potentially available to the agent corresponding to T-Limit node 210A. This upper limit of 272 credits corresponds to 16 reserved credits plus the 256 shared credits in the shared pool managed by T-Limit manager 205. The upper limit can be set to lower than reserved plus shared value if there is a need to limit the maximum bandwidth share an agent can achieve. At the snapshot in time represented by FIG. 2, T-Limit node 210A has no available credits of its reserved credits and 22 outstanding requests. Also, as shown at the snapshot in time represented by FIG. 2, T-Limit node 210B has no outstanding requests making all 16 of its reserved credits available. In general, T-Limit node 210B has a total of 16 reserved credits and an upper limit of 64 credits that are potentially available to the agent corresponding to T-Limit node 210B.

Additionally, T-Limit node 210N has no outstanding requests making all 16 of its reserved credits available at the snapshot in time represented by FIG. 2. In general, T-Limit node 210N has a total of 16 reserved credits and an upper limit of 96 credits that are potentially available to the agent corresponding to T-Limit node 210N. T-Limit manager 205 includes a picker which determines which T-Limit node 210A-N receives shared credits when multiple nodes are requesting more shared credits than are available in the shared pool. At the snapshot in time represented by FIG. 2, T-Limit manager 205 has 250 available credits from the original shared pool of 256 credits. It should be understood that the numbers of credits shown for T-Limit nodes 210A-N and T-Limit manager 205 are merely indicative of one particular embodiment. In other embodiments, other numbers of upper limits and credits may be available in the reserved portions for T-Limit nodes 210A-N and/or in the shared credit pool of T-Limit manager 205.

The arrows and numbers 1-5 indicate the steps that are performed for a T-Limit node to use a shared credit. For example, in one embodiment, T-Limit node 210A requests a shared credit from T-Limit manager 205 in step 1. If a shared credit is available, then T-Limit manager 205 allocates a shared credit to T-Limit node 210A in step 2. In another embodiment, the shared credit can be directly sent to the corresponding agent in step 2. Then, T-Limit node 210A enables a request to be sent from the agent to fabric and memory system 215 in step 3. A response to the request is returned to the agent in step 4. Finally, the shared credit is returned to the shared pool in step 5. It should be understood that the above description of steps 1-5 is merely indicative of one particular embodiment for a T-Limit node to consume a shared credit. It is noted that in other embodiments, other arrangements of steps may be used by T-Limit nodes 210A-N and T-Limit manager 205.

Figure 3:
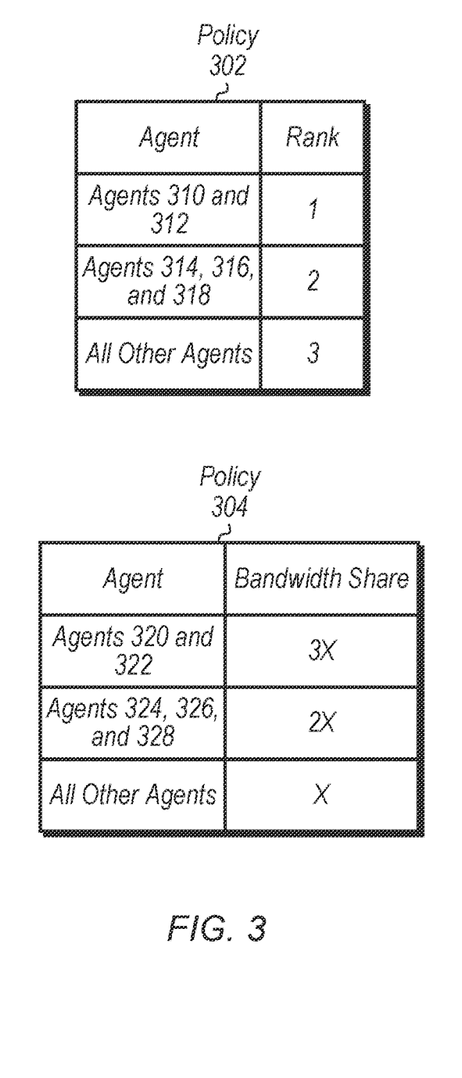
FIG. 3 illustrates examples of policies that may be implemented to determine which agent gets a credit when there are multiple agents requesting credits.

Referring now to FIG. 3, examples of policies that may be implemented to determine which agent gets a credit when there are multiple agents requesting credits are shown. Policy 302 represents ranking the different agents in the computing system based on their priority. For example, agents 310 and 312 have the highest rank of 1 as shown in the table representing policy 302. In one embodiment, agents 310 and 312 have the least energy efficiency. Accordingly, since agents 310 and 312 have the least energy efficiency, if their requests are delayed, it would cause significant energy drain. All other agents that are relatively more energy-efficient would have a ranking of 3. This would result in agents 310 and 312 receiving credits from the T-Limit manager when there are multiple agents requesting a limited supply of shared credits at the same time. The other agents with a ranking of 3 would be able to use only their private credits for sending requests to the endpoint in these situations. As shown in policy 302, agents 314, 316, and 318 have a ranking of 2, which means these agents would receive shared credits if the only other agents requesting shared credits have a ranking of 3. If agent 310 or 312 is requesting shared credits at the same time as agents 314, 316, and 318 and there is a limited supply of shared credits, agent 310 or 312 will receive the shared credits and agents 314, 316, and 318 will need to wait for responses and for private credits to be refilled.

Policy 304 provides another example of how to distribute shared credits between multiple agents when there is heavy traffic in the system. As shown for policy 304, agents 320 and 322 have a 3X bandwidth share while agents 324, 326, and 328 have a 2X bandwidth share. All other agents have an X bandwidth share. What this means in practice is that the shared credits are distributed to the agents at the ratios indicated in policy 304. For example, if agent 320 and another agent are competing for shared credits, agent 320 will get 3 times the bandwidth of the other agent. If agent 322 and agent 324 are competing for shared credits, agent 322 will get 3 credits for every 2 credits received by agent 324. In other embodiments, other ratios can be specified by a policy and enforced by the T-Limit manager.

Figure 4:
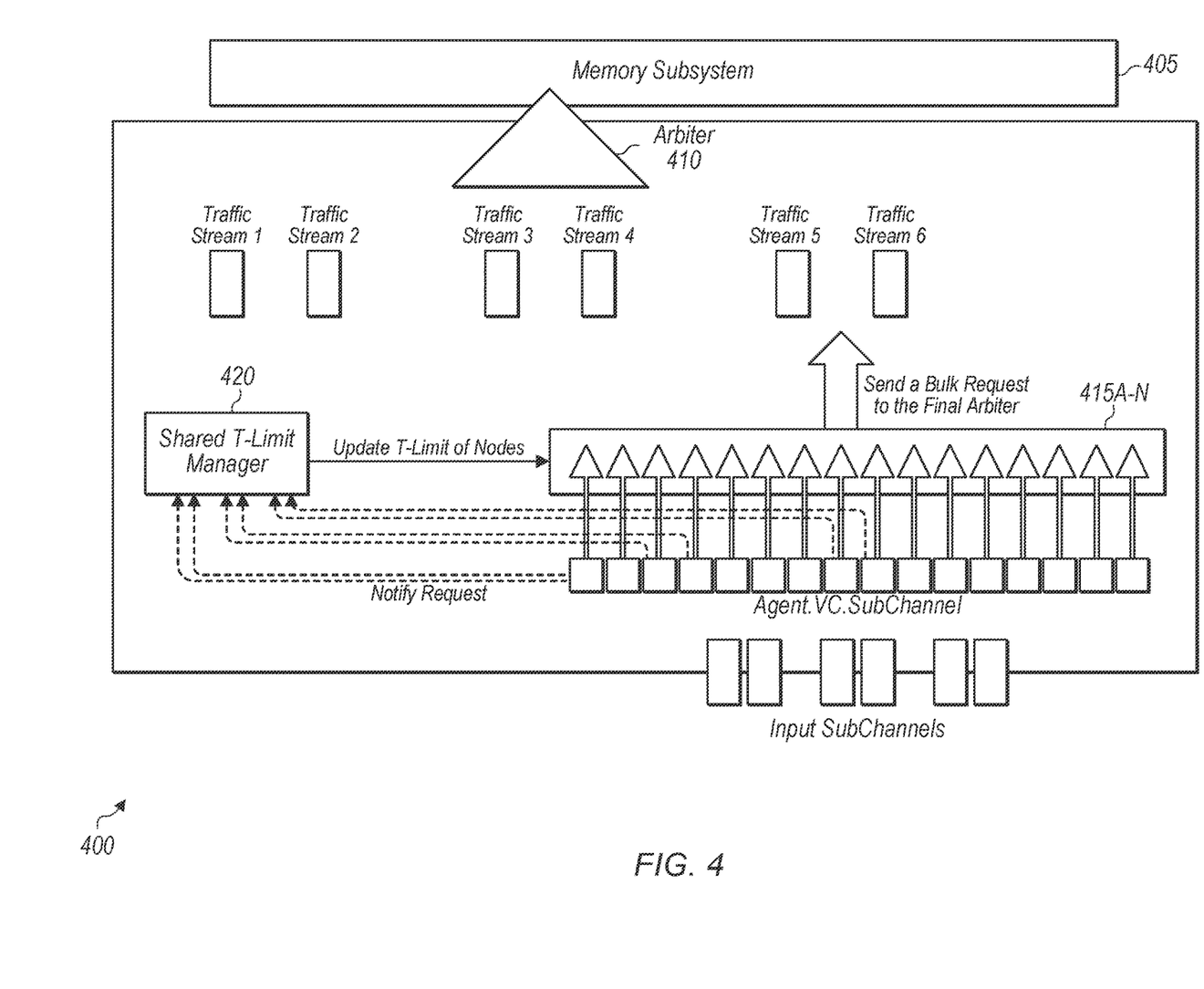
FIG. 4 is a block diagram of one embodiment of a system for intelligently limiting the total number of outstanding transactions targeting an endpoint.

Turning now to FIG. 4, a block diagram of one embodiment of a system 400 for intelligently limiting the total number of outstanding transactions targeting an endpoint is shown. In one embodiment, system 400 includes memory subsystem 405, arbiter 410, T-Limit nodes 415A-N, and shared T-Limit manager 420. In various embodiments, memory subsystem 405 includes a memory controller and any number of memory devices, with the number varying according to the embodiment. Arbiter 410 arbitrates across the various streams of traffic (shown as Traffic Stream 1, Traffic Stream 2, etc.,)

The locations of shared T-Limit manager 420 and T-Limit nodes 415A-N within system 400 may vary according to the embodiment. It is noted that the placement of shared T-Limit manager 420 and T-Limit nodes 415A-N can be anywhere in the interconnect and/or fabric and/or in the agent's subsystem before the requests enter memory subsystem 405. When T-Limit nodes 415A-N are placed closer to their respective agents, the latency between each T-Limit node 415A-N and shared T-Limit manager 420 would be longer. In this scenario, credits may be prefetched to ensure that the link to memory subsystem 405 stays busy. In another embodiment, T-Limit nodes 415A-N and shared T-Limit manager 420 are placed closer to memory subsystem 405 and requests are separated based on agent ID. This helps to reduce the round-trip latency between T-Limit nodes 415A-N and shared T-Limit manager 420.

In one embodiment, the fabric supports grouping requests based on agent ID, virtual channel (VC), and subchannel. In this embodiment, whenever a request is enqueued and a private credit is not available for the request, a notification is sent to shared T-Limit manager 420 requesting a credit. The picker of shared T-Limit manager 420 determines whether to allow the request to go to the memory subsystem 405. If there are enough credits for the agent ID, VC, and subchannel of the request, the T-Limit of the agent is increased by 1 and the T-Limit node and/or agent is notified. Then, the T-Limit node allows the request to go through to arbiter 410 which arbitrates across multiple traffic streams.

By implementing the above approach, various advantages are gained as compared to the traditional approaches. For example, the above approach allows for fine-grain control of bandwidth across agents in a VC. Also, the mechanism to implement the above approach may be applied within the fabric (e.g., fabric 110 of FIG. 1) without requiring changes to other components. Additionally, if data storage located at a common location (like fabric or shared cache) is shared across multiple agents, the above approach allows for the size of the data storage to be reduced and prevents over-provisioning. Since there is a deterministic number of packets at any moment in time, with a clear upper bound which is the sum of private and shared credits, system 400 can have a shared downstream buffer of size equal to the maximum number of packets that can be in-flight to the memory subsystem 405. For example, the total datastore needed for system 400 is the sum of the shared T-Limit pool size plus all of the minimum reserved entries for the different T-Limit nodes 415A-N. Reducing the size of the data storage can result in substantial area and power savings for the fabric and the whole system.

Figure 5:
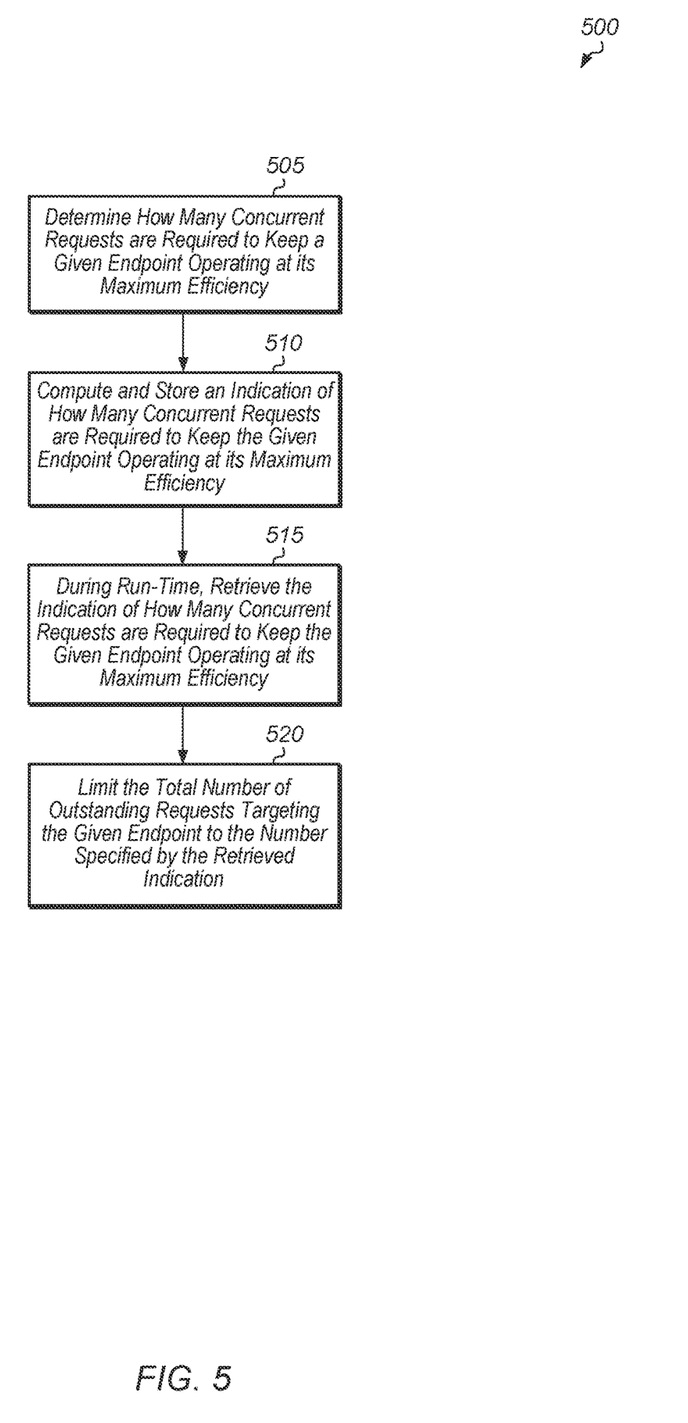
FIG. 5 is a flow diagram of one embodiment of a method for controlling bandwidth through shared transaction limits.

Referring now to FIG. 5, a generalized flow diagram of one embodiment of a method 500 for controlling bandwidth through shared transaction limits is shown. For purposes of discussion, the steps in this embodiment (as well as for FIGS. 6 and 7) are shown in sequential order. However, in other embodiments some steps may occur in a different order than shown, some steps may be performed concurrently, some steps may be combined with other steps, and some steps may be absent.

A system determines how many concurrent requests are required to keep a given endpoint operating at its maximum efficiency (block 505). In one embodiment, the given endpoint is a memory subsystem. In other embodiments, the given endpoint may be other types of devices or systems. In one embodiment, the number of concurrent requests required to keep the given endpoint at its maximum efficiency is determined by the amount of parallel processing resources of the given endpoint. For example, for a memory subsystem, the number of concurrent requests required to keep the memory subsystem at its maximum efficiency can be determined by the numbers of channels and banks able to be simultaneously accessed and the frequency at which memory runs. With more parallel capability through more channels and banks, and higher frequency of the memory subsystem, more requests can be processed at any given time. However, there is a point when the memory system is operating at maximum efficiency and adding more requests would not give any more bandwidth, because every cycle has been utilized by a pending request. Adding more requests at this point only increases the latency observed by the agents. From the agents' perspective, when the memory system is overloaded with more requests than what is needed for maximum efficiency, the system ends up in a scenario where agents simply add more and more queuing latency without getting any bandwidth or efficiency benefits. This also leads to agents competing against each other by generating more requests, taking up a larger number of memory slots (at the bank and channel queues), and thereby consuming a larger share of the memory bandwidth. Eventually, this becomes detrimental for the other agents who did not increase their number of maximum outstanding requests.

Next, the system computes and stores an indication of how many concurrent requests are required to keep the given endpoint operating at its maximum efficiency (block 510). Then, during run-time, the system retrieves the stored indication of how many concurrent requests are required to keep the given endpoint operating at its maximum efficiency (block 515). Next, the system limits the total number of outstanding requests to the number specified by the retrieved indication (block 520). One example of implementing block 520 is described in more detail in the discussion associated with method 600 (of FIG. 6). After block 520, method 500 ends.

Figure 6:
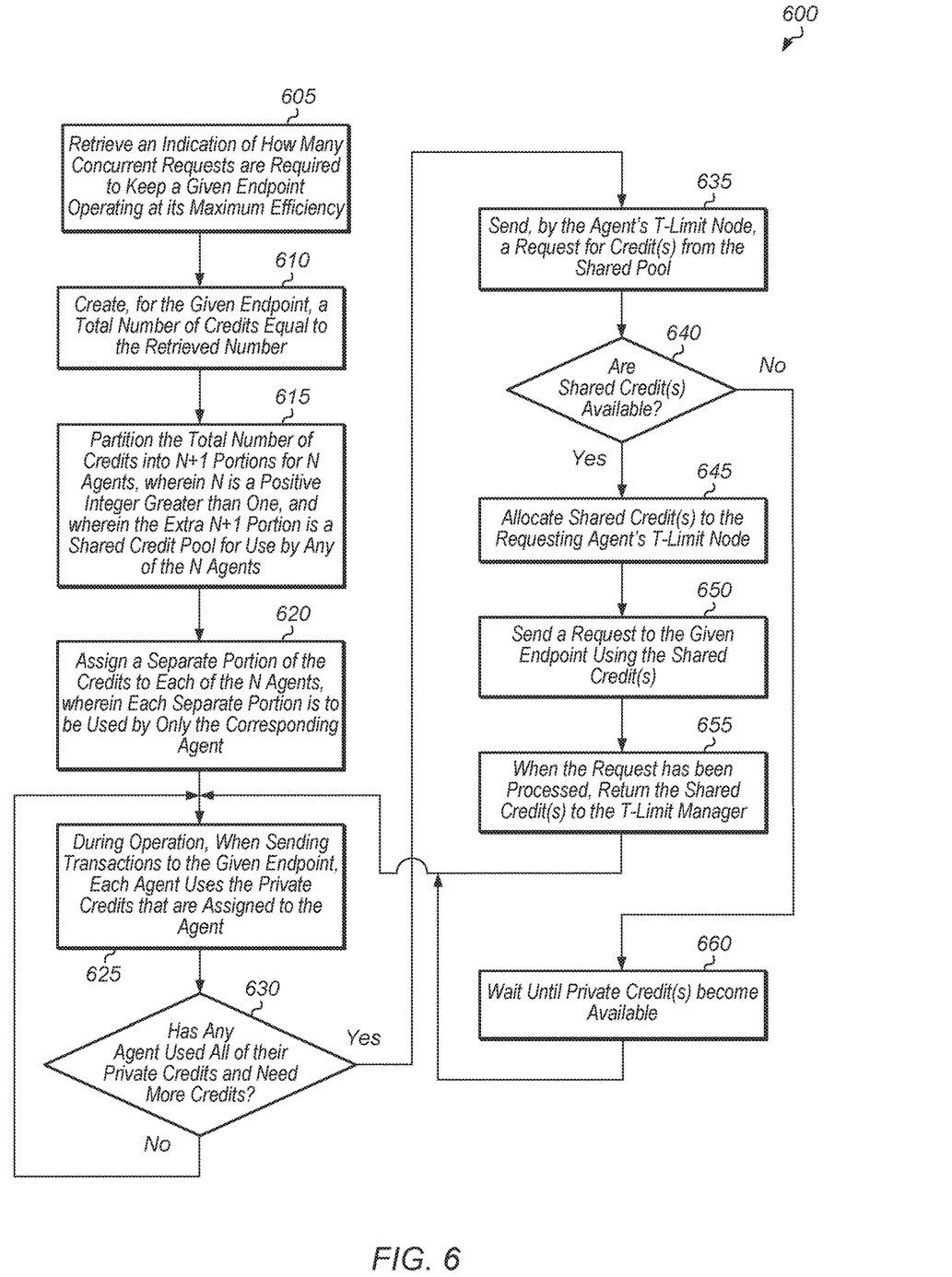
FIG. 6 is a flow diagram of one embodiment of a method for limiting the total number of outstanding requests in route to a given endpoint.

Turning now to FIG. 6, one embodiment of a method 600 for limiting the total number of outstanding requests in route to a given endpoint is shown. A Transaction-Limit (T-Limit) manager retrieves an indication of how many concurrent requests are required to keep a given endpoint operating at its maximum efficiency (block 605). In one embodiment, the given endpoint is a memory subsystem. In other embodiments, the given endpoint may be other types of devices or systems. Next, the T-Limit manager creates, for the given endpoint, a total number of credits equal to the retrieved number (block 610).

Then, the total number of credits is partitioned into N+1 portions for N agents, wherein N is a positive integer greater than one, and wherein the extra N+1 portion is a shared credit pool for use by any of the N agents (block 615). The agents can be processing units, display controllers, flash memory controllers, graphics processing units (GPUs), and the like. The T-Limit manager assigns a separate portion of the credits to each of the N agents, wherein each separate portion is to be used by only the corresponding agent (block 620). It is noted that the N portions for the N agents are not necessarily equal across the N agents. In one embodiment, the T-Limit manager determines how many private credits to assign to each agent based on the agent's latency requirements. In another embodiment, the T-Limit manager determines how many private credits to assign to each agent based on the agent's performance requirements. In other embodiments, the T-Limit manager uses other techniques for determining how many private credits to assign to each agent.

During operation, each agent uses the private credits that are assigned to the agent when sending requests to the given endpoint (block 625). If any agent has used all of their private credits and needs more credits (conditional block 630, "yes" leg), then the agent's T-Limit node sends, to the T-Limit manager, a request for one or more additional credits from the shared pool (block 635). If none of the agents have used all of their private request credits (conditional block 625, "no" leg), then method 600 returns to block 620 and each agent uses its private credits when the agent needs to send a request to the given endpoint.

After block 635, if one or more shared credits are available (conditional block 640, "yes" leg), then the T-Limit manager allocates one or more shared credits to the requesting agent's T-Limit node (block 645). In another embodiment, the one or more shared credits are allocated to the requesting agent in block 645. Next, the requesting agent sends a request to the given endpoint using the one or more shared credits (block 650). When the request has been processed, the requesting agent's T-Limit node returns the one or more shared credits to the T-Limit manager (block 655). Alternatively, in another embodiment, the requesting agent returns the one or more shared credits to the T-Limit manager in block 655. After block 655, method 600 returns to block 625. If one or more shared credits are not available (conditional block 635, "no" leg), then the requesting agent waits until one or more private credits become available (block 660). Alternatively, in parallel with or in place of block 660, the agent can send another shared credit request to the T-Limit manager after a short wait. After block 660, method 600 returns to block 625. It is noted that multiple separate iterations of method 600 may be implemented and run concurrently for multiple different endpoints in the system.

Figure 7:
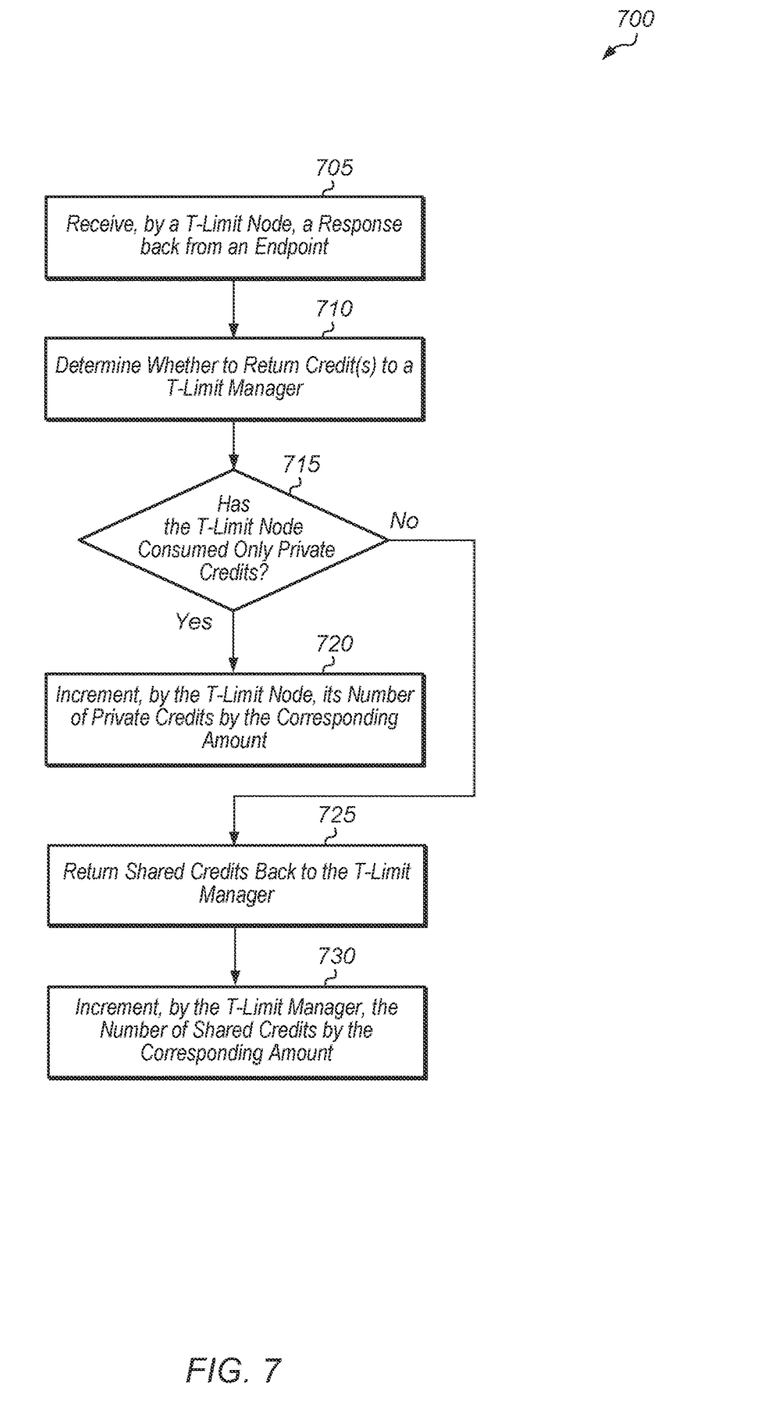
FIG. 7 is a flow diagram of one embodiment of a method for a T-Limit node processing a response to a request.

Referring now to FIG. 7, one embodiment of a method 700 for a T-Limit node processing a response to a request is shown. A T-Limit node receives a response back from an endpoint (e.g., memory subsystem) (block 705). It is assumed for the purposes of this discussion that the T-Limit node is associated with a given agent. In response to receiving the response, the T-Limit node determines whether to return credit(s) to a T-Limit manager (block 710). If the T-Limit node has consumed only private credits (conditional block 715, "yes" leg), then the T-Limit node increments its number of private credits by the corresponding amount (block 720). Otherwise, if the T-Limit node has consumed shared credits (conditional block 715, "no" leg), then the T-Limit node returns shared credits back to the T-Limit manager (block 725). Next, the T-Limit manager increments the number of shared credits by the corresponding amount (block 730). After blocks 720 and 730, method 700 ends.

Figure 8:
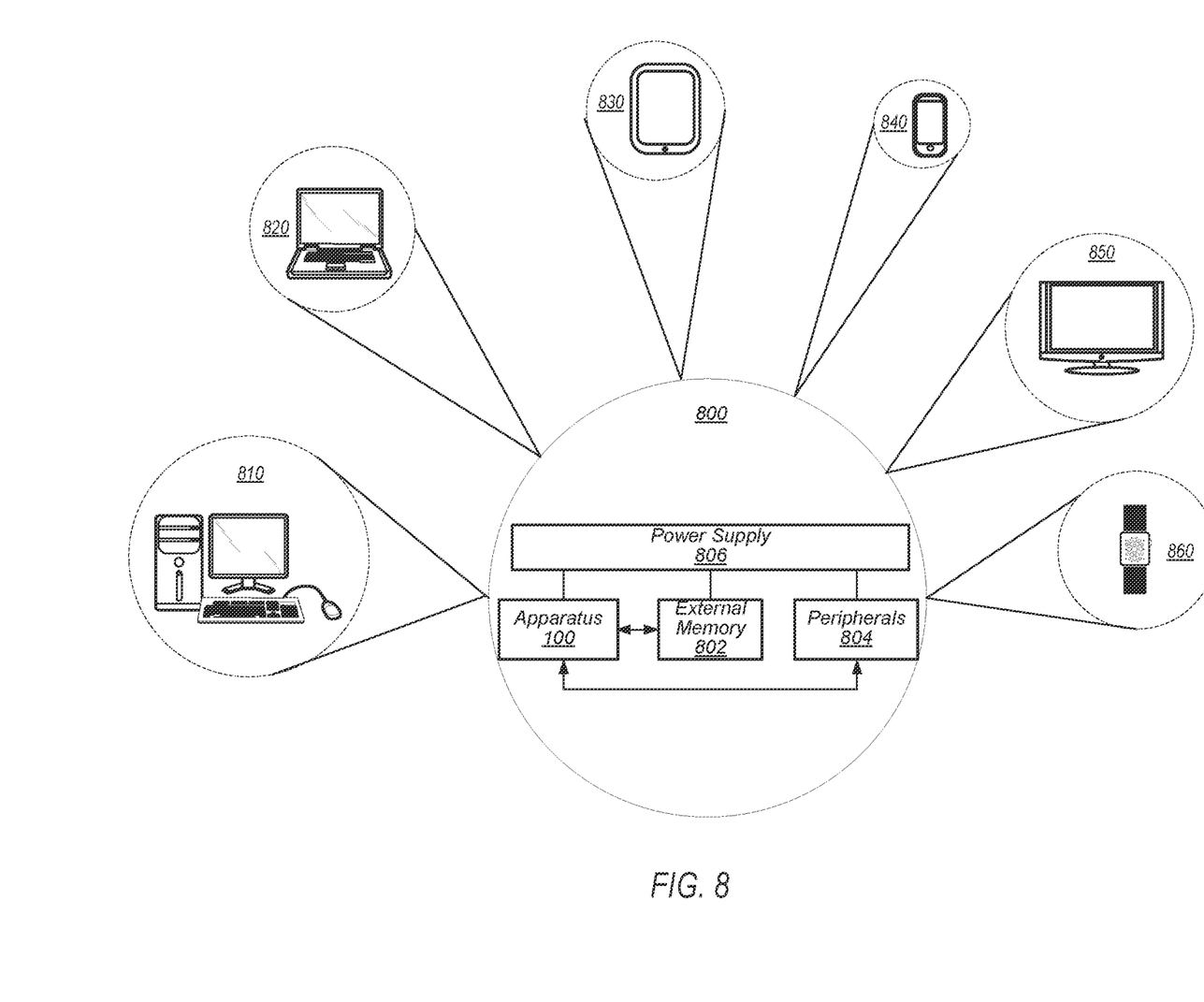
FIG. 8 is a block diagram of one embodiment of a system.

Turning now to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of apparatus 100 (of FIG. 1) coupled to an external memory 802. In various embodiments, apparatus 100 may be included within a system on chip (SoC) or integrated circuit (IC) which is coupled to external memory 802, peripherals 804, and power supply 806.

Apparatus 100 is coupled to one or more peripherals 804 and the external memory 802. A power supply 806 is also provided which supplies the supply voltages to apparatus 100 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of apparatus 100 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with apparatus 100 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as wife, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
transaction-limit manager circuitry configured to:
  partition a plurality of credits into N+1 portions for use by N agents, wherein one portion of the N+1 portions is a shared credit pool for use by any of the N agents;
  assign a separate portion of N of the N+1 portions to each of the N agents to be used as private credits, wherein each separate portion of private credits is to be used by only a corresponding agent;
  assign a ranking to one or more of the N agents, based at least in part on an energy efficiency of a respective agent; and
  allocate credits from the shared credit pool to one or more of the N agents, based at least in part on a corresponding assigned ranking.

2. The system as recited in claim 1, wherein the transaction-limit manager circuitry is configured to allocate more credits to a first agent of the N agents than a second agent of the N agents, responsive to a ranking of the first agent indicating the first agent is less energy efficient than the second agent.

3. The system as recited in claim 1, wherein the plurality of credits includes a number of credits which correspond to a number of transactions that are able to concurrently access parallel resources of an endpoint.

4. The system as recited in claim 1, wherein the transaction-limit manager circuitry is further configured to:
  assign a number of private credits and an upper limit to a corresponding agent, wherein an agent is not allowed to issue a request if the agent has a number of outstanding requests that is greater than or equal to the upper limit.

5. The system as recited in claim 1, wherein the transaction-limit manager circuitry is further configured to:
  determine a priority for each agent of the N agents; and
  assign a number of private credits to a corresponding agent, wherein the number is calculated based on the priority determined for the corresponding agent.

6. The system as recited in claim 1, wherein in order to generate a request that accesses an endpoint, an agent of the N agents must have an available credit.

7. The system as recited in claim 6, wherein a number of credits in the plurality of credits created by the transaction-limit manager is based on a number of transactions to cause a memory subsystem to be operating at maximum efficiency.

8. A method comprising:
  partitioning a plurality of credits into N+1 portions for use by N agents, wherein one portion of the N+1 portions is a shared credit pool for use by any of the N agents and N is a positive integer greater than one;
  assigning a separate portion of N of the N+1 portions to each of the N agents to be used as private credits, wherein each separate portion of private credits is to be used by only a corresponding agent;
  assigning a ranking to one or more of the N agents, based at least in part on an energy efficiency of a respective agent; and
  allocating credits from the shared credit pool to one or more of the N agents, based at least in part on a corresponding assigned ranking.

9. The method as recited in claim 8, further comprising allocating more credits to a first agent of the N agents than a second agent of the N agents, responsive to a ranking of the first agent indicating the first agent is less energy efficient than the second agent.

10. The method as recited in claim 8, wherein the plurality of credits includes a number of credits which correspond to a number of transactions that are able to concurrently access parallel resources of an endpoint.

11. The method as recited in claim 8, further comprising: assigning a number of private credits and an upper limit to a corresponding agent, wherein the number and the upper limit are calculated based on the minimum bandwidth-share value and the maximum bandwidth-share value determined for the corresponding agent.

12. The method as recited in claim 11, further comprising: wherein an agent is not allowed to issue a request if the agent has a number of outstanding requests that is greater than or equal to the upper limit.

13. The method as recited in claim 8, wherein in order to generate a request that accesses an endpoint, an agent of the N agents must have an available credit.

14. The method as recited in claim 13, wherein endpoint is a memory subsystem.

15. A system comprising:
a plurality of N agents, wherein N is a positive integer greater than one; and
a communication fabric; and
an endpoint coupled to the N agents via the communication fabric;
wherein the communication fabric comprises circuitry configured to:
partition a plurality of credits into N+1 portions for the N agents, wherein one portion of the N+1 portions is a shared credit pool for use by any of the N agents;
assign a separate portion of N of the N+1 portions to each of the N agents to be used as private credits, wherein each separate portion of private credits is to be used by only a corresponding agent; and
allocate credits from the shared credit pool to agents of the N agents, based at least in part on an energy efficiency of a respective agent.

16. The system as recited in claim 15, wherein the circuitry of the communication fabric is configured to allocate more credits to a first agent of the N agents than a second agent of the N agents, responsive to the first agent being less energy efficient than the second agent.

17. The system as recited in claim 15, wherein the plurality of credits includes a number of credits which correspond to a number of transactions that are able to concurrently access parallel resources of the endpoint.

18. The system as recited in claim 15, wherein the circuitry of the communication fabric is configured to rank one or more of the N agents based on an energy efficiency of the one or more of the N agents.

19. The system as recited in claim 15, wherein the circuitry of the communication fabric is configured to:
determine a priority for each agent of the N agents; and
assign a number of private credits to a corresponding agent, wherein the number is calculated based on the priority determined for the corresponding agent.

20. The system as recited in claim 15, wherein the endpoint is one of a memory controller, memory subsystem, memory device, memory interface, input/output interface, I/O device, or a peripheral device.

* * * * *